US 12,115,923 B2

(12) United States Patent
Ono et al.

(10) Patent No.: US 12,115,923 B2
(45) Date of Patent: Oct. 15, 2024

(54) EARTH STRUCTURE FOR FILLER PIPE

(71) Applicant: YACHIYO INDUSTRY CO., LTD., Sayama (JP)

(72) Inventors: Takahiko Ono, Tochigi (JP); Takeshi Hirohara, Tochigi (JP); Hiroshi Hanahara, Tochigi (JP); Tadashi Koyama, Tochigi (JP); Takatoshi Nagata, Tochigi (JP)

(73) Assignee: YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 18/546,671

(22) PCT Filed: Jan. 12, 2022

(86) PCT No.: PCT/JP2022/000731
§ 371 (c)(1),
(2) Date: Aug. 16, 2023

(87) PCT Pub. No.: WO2022/181089
PCT Pub. Date: Sep. 1, 2022

(65) Prior Publication Data
US 2024/0166151 A1 May 23, 2024

(30) Foreign Application Priority Data
Feb. 24, 2021 (JP) .................. 2021-027216

(51) Int. Cl.
*B60R 16/06* (2006.01)
*B60K 15/04* (2006.01)
*B60K 15/05* (2006.01)

(52) U.S. Cl.
CPC .......... *B60R 16/06* (2013.01); *B60K 15/0406* (2013.01); *B60K 15/05* (2013.01);
(Continued)

(58) Field of Classification Search
CPC ................. B60K 15/04; B60K 2015/0429
See application file for complete search history.

(56) References Cited

U.S. PATENT DOCUMENTS 8,539,993 B2  9/2013  Hagano
8,714,213 B2  5/2014  Girgenrath
(Continued)

FOREIGN PATENT DOCUMENTS

JP  2009-220590 A  10/2009
JP  2016-120741 A  7/2016

OTHER PUBLICATIONS

Written Opinion (with English translation) for corresponding Application No. PCT/JP2022/000731, dated Mar. 1, 2022, 6 pages.
(Continued)

*Primary Examiner* — Timothy P. Kelly
(74) *Attorney, Agent, or Firm* — Dority & Manning, P.A.

(57) ABSTRACT

An earth structure for a filler pipe includes a filler pipe; a tubular cover member in which an upstream end of the filler pipe is inserted and which defines a fueling port; an annular seal part interposed between the filler pipe and the cover member; and an earth member which is mounted an outer surface of the filler pipe and extends along a longitudinal direction of the filler pipe. The cover member is made of a conductive material, and the earth member is in contact with the cover member on a downstream side of the seal part. Since it is not necessary to dispose the earth member so as to pass through the seal part, the sealability between the filler pipe and the cover member improves.

9 Claims, 7 Drawing Sheets

(52) U.S. Cl.
 CPC .............. *B60K 2015/0419* (2013.01); *B60K 2015/0458* (2013.01); *B60K 2015/0474* (2013.01)

(56) References Cited

U.S. PATENT DOCUMENTS

| | | |
|---|---|---|
| 8,776,345 B2 | 7/2014 | Komatsu et al. |
| 11,091,028 B2* | 8/2021 | Ogose .................. B67D 7/3236 |
| 11,338,668 B2 | 5/2022 | Shiokawa et al. |
| 11,371,479 B2 | 6/2022 | Tomimatsu et al. |
| 2008/0164255 A1 | 7/2008 | Dufays |
| 2015/0375615 A1* | 12/2015 | Brown ............... B60K 15/0406 220/86.1 |
| 2017/0297426 A1 | 10/2017 | Sperando et al. |
| 2020/0376956 A1* | 12/2020 | Dufendach ............ B60K 15/04 |

OTHER PUBLICATIONS

International Search Report (with English translation) for Application No. PCT/JP2022/000731, dated Mar. 1, 2022, 4 pages.
International Search Report (with English translation) for Application Number PCT/JP2022/000731, dated Mar. 1, 2022, 4 pages.

* cited by examiner

EARTH STRUCTURE FOR FILLER PIPE

CROSS REFERENCE TO RELATED APPLICATIONS

This application is the U.S. National Stage entry of International Application No. PCT/JP2022/000731, filed on Jan. 12, 2022, which, in turn, claims priority to Japanese Patent Application No. 2021-027216, filed on Feb. 24, 2021, both of which are hereby incorporated herein by reference in their entireties for all purposes.

TECHNICAL FIELD

The present disclosure relates to an earth structure for a filler pipe.

BACKGROUND ART

In a fueling device installed in a vehicle, such as an automobile, an earth structure for grounds the outer end portion of the filler pipe via a vehicle body to prevent electrification of the outer end portion of the filler pipe. As a fueling device provided with such an earth structure, known is a fueling device including a filler pipe, a tubular outer tubular member in which the outer end portion (upstream end portion) of the filler pipe is inserted and which defines a fueling port, and a spring piece electrically connecting a conductive inner tubular member provided at the outer end portion of the filler pipe to a conductive stay, wherein the stay is grounded via a vehicle body (Patent Document 1). In this fueling device, the outer tubular member is formed with a notch from a downstream-side end portion toward an upstream side such that the spring piece is disposed to pass through the notch.

In the case where a notch is provided in the outer tubular member, the outer tubular member does not function to cover the filler pipe at that part. Also, sealability between the filler pipe and the outer tubular member is not secured.

As a fueling device that can solve such a problem, a fueling device provided with an earth structure shown in FIG. 7 is publicly used. In this fueling device 101, a tubular cover member 105 in which an outer end portion of a filler pipe 104 is inserted is not provided with a notch, and an earth member 130 consisting of a metal plate is provided to contact a conductive nozzle guide member 116 disposed inside the outer end portion of the filler pipe 104. The earth member 130 is bent at the upstream end of the filler pipe 104, extends in a longitudinal direction from the upstream end toward a downstream side along an outer surface of the filler pipe 104, and contacts a conductive stay 108 at a position exceeding the downstream end of the cover member 105. To improve the sealability between the filler pipe 104 and the cover member 105, a seal member 140 is provided on the outer circumference side of the cover member 105. The seal member extends out more downward than the downstream end of the cover member 105, and the downstream end thereof closely contacts an outer circumferential surface of the filler pipe 104.

PRIOR ART DOCUMENT(S)

Patent Document(s)

[Patent Document 1] JP6784740B2

SUMMARY OF THE INVENTION

Task to be Accomplished by the Invention

However, in the conventional fueling device, since the earth member is disposed to pass through a part where the seal member and the filler pipe closely contact each other, it is difficult to ensure sealability at the part where the earth member passes through, and thus, it is difficult to achieve high sealability.

In view of such background, an object of the present invention is to provide an earth structure for a filler pipe capable of improving the sealability between the filler pipe and the cover member.

Means to Accomplish the Task

To achieve such an object, one embodiment of the present invention is an earth structure for a filler pipe, comprising: the filler pipe (4); a tubular cover member (5) into which an upstream end (4a) of the filler pipe is inserted and which defines a fueling port (3); an annular seal part (22) interposed between the filler pipe and the cover member; and an earth member (30) which is mounted on an outer surface (4b) of the filler pipe and extends along a longitudinal direction of the filler pipe, wherein the cover member is made of a conductive material, and the earth member contacts the cover member downstream of the seal part.

According to this configuration, even though the earth member is not disposed to pass through the seal part, the earth member contacts the cover member made of a conductive material, whereby the cover member is grounded and electrification of the cover member is prevented. Further, since it is not necessary to dispose the earth member so as to pass through the seal part, the sealability between the filler pipe and the cover member can be improved.

Preferably, the earth structure for the filler pipe further comprises an opening and closing member (41) provided to be displaceable between a closed position in which the opening and closing member closes the fueling port (3) and an open position which is positioned downstream of the closed position and in which the opening and closing member opens the fueling port; and an urging member (43) always urging the opening and closing member toward the closed position, wherein the opening and closing member is made of a conductive material and, when in the closed position, contacts the cover member (5).

According to this configuration, the opening and closing member opens the fueling port when pushed in downstream direction by the fueling nozzle. When the fueling nozzle contacts the opening and closing member to open the fueling port, the fueling nozzle is electrically connected to the cover member through the opening and closing member and is grounded through the earth member.

Preferably, the urging member (43) is made of a conductive material and is provided to be always in contact with an inner surface (41a) of the opening and closing member and an inner surface (5d) of the cover member.

According to this configuration, the opening and closing member is electrically connected to the cover member through the urging member not only when in the closed position but also when in a position other than the closed position.

Preferably, the opening and closing member (41) is pivotably supported by an annular member (42) fitted inside the cover member (5), and the annular member is formed with a notch (42a) or a through hole for allowing the urging member (43) to contact the cover member.

According to this configuration, there is no need to provide the cover member with a structure for rotatably supporting the opening and closing member. Therefore, the shape of the cover member made of a conductive material is simple, and the moldability of the cover member is good. Also, this allows a high degree of design freedom of the structure for rotatably supporting the opening and closing member.

Preferably, the seal part is a ridge (22) formed integrally with one of the filler pipe (4) made of resin and the cover member (5) made of resin.

According to this configuration, there is no need to prepare an additional member for sealing. Therefore, the number of components is reduced and the number of assembly steps is reduced.

Preferably, the seal part (22) is formed integrally with the filler pipe (4), and a part of the outer surface of the filler pipe covered by the cover member (5) is provided with multiple reinforcement parts (21, 23, 24) extending in a circumferential direction, at least one of the reinforcement parts being disposed on each of an upstream side and a downstream side of the seal part.

According to this configuration, since the multiple reinforcement parts and the seal part are formed on the outer surface of the filler pipe, the filler pipe can be reinforced without deterioration of assemblability, and deformation of the cover member can be suppressed. Also, since the deformation of the cover member is suppressed, lowering of sealability is suppressed.

Preferably, each of the reinforcement parts (21, 23, 24) has an outer diameter smaller than an inner diameter of a part of the cover member corresponding thereto.

According to this configuration, deterioration of close contactability of the seal part with the inner surface of the cover member is suppressed. Therefore, it is possible to suppress deformation of the cover member while ensuring sealability between the filler pipe and the cover member.

Preferably, the reinforcement parts (21, 23, 24) are disposed at the upstream end (4a) of the filler pipe (4) and at a part of the filler pipe corresponding to a downstream end (5c) of the cover member (5).

According to this configuration, deformation of the cover member can be effectively suppressed.

Preferably, a gap is provided between the downstream end (5c) of the cover member and the outer surface of the filler pipe opposing thereto, and the earth member is a bent product of a plate member, an upstream part (31) of the earth member being bent outward in a hairpin shape and resiliently contacts the inner surface (5d) of the cover member.

According to this configuration, when the upstream end of the filler pipe is inserted in the cover member, the upstream part of the earth member contacts the inner surface of the cover member. Therefore, assembly of the earth member is easy.

Preferably, the inner surface of the downstream end of the cover member is provided with a recess or a through hole (5e), and the upstream part of the earth member is resiliently locked in the recess or the through hole.

According to this configuration, since the upstream part of the earth member is locked in the recess or the through hole, displacement of the earth member after the assembly is prevented.

Preferably, a projection (26) is provided on the outer surface (4b) of the filler pipe (4) on a downstream side of the downstream end of the cover member, a recess or a through hole (26a) is provided in an upstream side surface or a downstream side surface of the projection, and the earth member comprises a surrounding part (34) extending along an outer contour of the projection to surround the projection from three sides, and an engagement part (35) that protrudes into the recess or the through hole from the surrounding part.

According to this configuration, since the engagement part of the earth member is locked to the projection of the filler pipe, falling of the earth member from the filler pipe at the time of assembly is prevented.

Effect of the Invention

Thus, according to the present invention, it is possible to provide an earth structure for a filler pipe capable of improving the sealability between the filler pipe and the cover member.

MODE(S) FOR CARRYING OUT THE INVENTION

In the following, an embodiment of the present invention will be described in detail with reference to the drawings.

Figure 1:
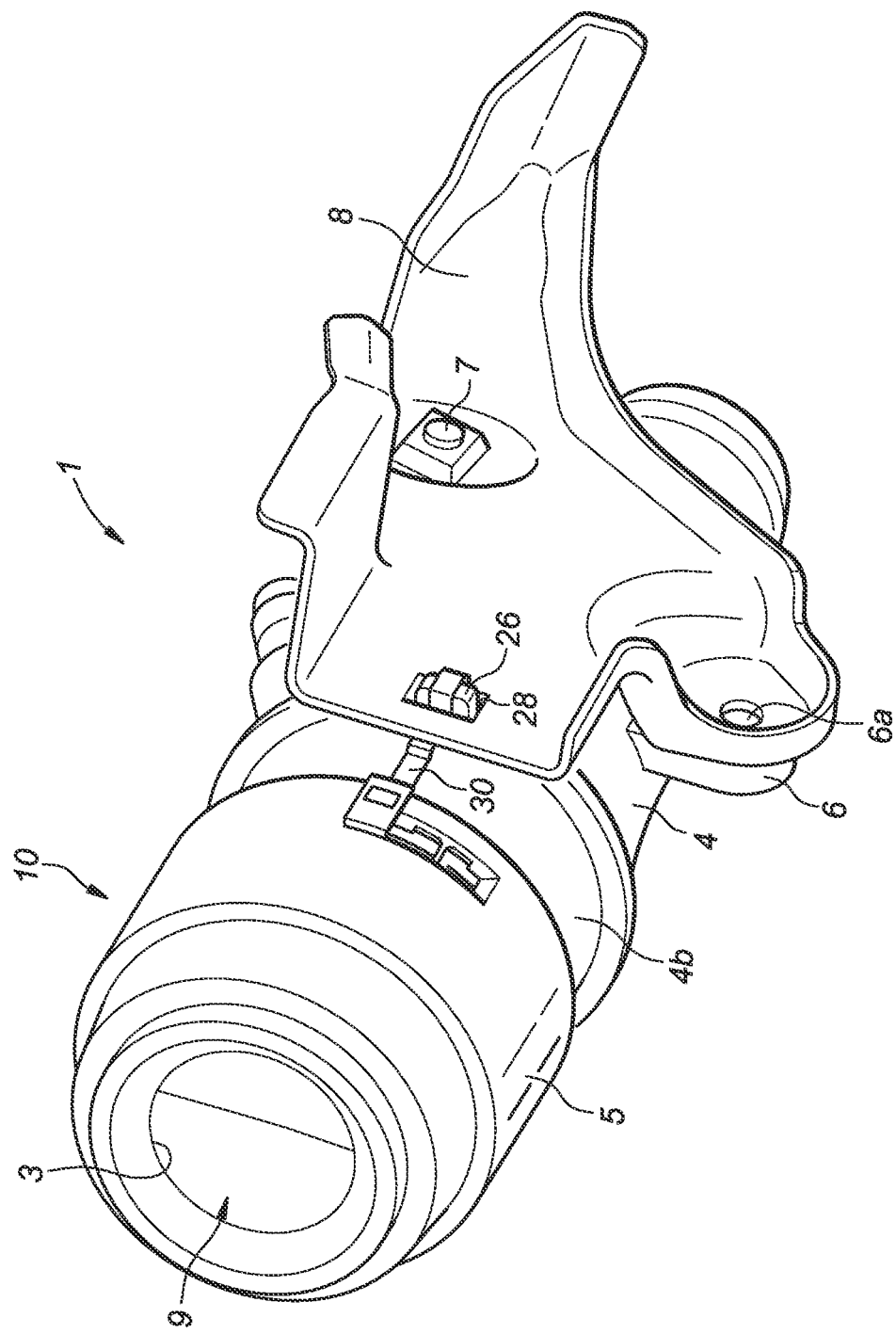
FIG. 1 is a main part perspective view showing a mounting state of a fueling device according to an embodiment.

FIG. 1 is a main part perspective view showing a mounting state of a fueling device 1 according to an embodiment. The fueling device 1 is a device for guiding the liquid fuel supplied from a fueling nozzle 2 (see FIG. 6) to the fuel tank. In the present embodiment, the fueling device 1 is installed in an automobile that travels on liquid fuel such as gasoline and diesel oil, and guides the fuel to the fuel tank for traveling.

As shown in FIG. 1, the fueling device 1 includes, as members for forming a flow path from the fueling port 3 to the fuel tank, a filler pipe 4 connected to the fuel tank at one end thereof and a tubular cover member 5 into which the other end portion of the filler pipe 4 is inserted and which defines a fueling port 3. Note that in FIG. 1, only a part of the other end portion of the filler pipe 4 is shown. In the following, a side of the flow path of the fuel close to the fuel tank may be referred to as a downstream side, and a side of the flow path close to the fueling port 3 may be referred to as an upstream side. An upstream end 4a (FIG. 2) of the filler pipe 4 is inserted into the cover member 5.

The filler pipe 4 is a substantially cylindrical pipe member made of non-conductive resin, and internally defines a fuel flow path extending in the longitudinal direction. An outer surface 4b of the filler pipe 4 is provided with a pair of tongue pieces 6 (only one of them is shown in FIG. 1) that protrude radially outward. The two tongue pieces 6 each has a plate shape and forms a wall surface parallel to the longitudinal direction of the filler pipe 4. The two tongue pieces 6 are arranged on the outer surface 4b of the filler pipe 4 to be spaced from each other in the circumferential direction. Each tongue piece 6 is provided with a mounting hole 6a penetrating therethrough in the thickness direction thereof.

A bracket 8 is joined to the pair of tongue pieces 6 by metal screw members 7 inserted in the mounting holes 6a. The bracket 8 is a metal plate-shaped member (stay) having conductivity, and is attached to the tongue pieces 6 of the filler pipe 4 on one side and attached to the vehicle body on the other side by metal bolts. Thereby, the filler pipe 4 is supported by the vehicle body via the bracket 8. Note that the vehicle body here means a metal frame (member) forming a skeleton of the vehicle or a metal panel provided on the frame. With the bracket 8 fastened to the vehicle body, the bracket 8 is grounded through the vehicle body. The bracket 8 may be fastened to the pair of tongue pieces 6 by means of fastening members such as rivets and clips instead of the screw members 7.

The cover member 5 is a member made of resin having conductivity, and externally fitted on the upstream end 4a of the filler pipe 4, and defines a substantially circular fueling port 3 at an upstream end portion thereof. The cover member 5 covers an upstream side portion and an upstream end surface of the outer surface 4b of the filler pipe 4. The fueling device 1 is further provided with a shutter 9 for opening and closing the fueling port 3. The shutter 9 is mounted to the cover member 5, and the shutter 9 and the cover member 5 constitute a cover unit 10.

Figure 2:
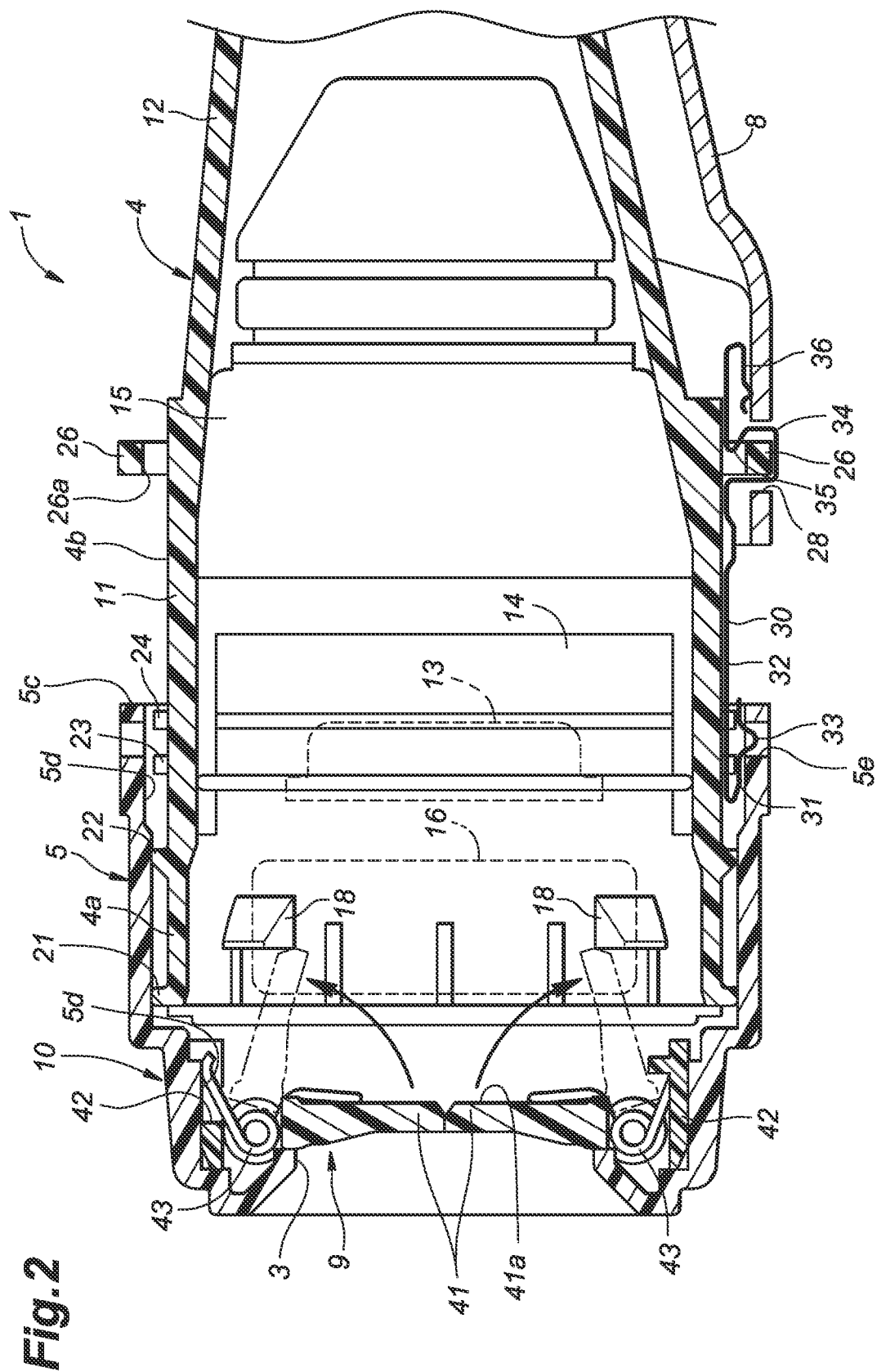
FIG. 2 is a vertical sectional view of a main part of the fueling device shown in FIG. 1.

FIG. 2 is a vertical sectional view of a main part of the fueling device 1 shown in FIG. 1. As shown in FIG. 2, the filler pipe 4 includes a large diameter part 11 which is disposed on the upstream side and opens substantially circularly at the upstream end 4a and a tapered part 12 which extends from the large diameter part 11 so as to diminish in diameter toward the downstream side. Inside the large diameter part 11, a valve support member 14 that holds a main flap valve 13 so as to be capable of opening and closing by pivoting is provided. On the downstream side of the valve support member 14 and inside the tapered part 12, a fuel guide member 15 for guiding the fuel is provided. Inside the valve support member 14 and on the upstream side of the main flap valve 13, a nozzle guide member 16 for guiding the fueling nozzle 2 (FIG. 6) is provided.

Figure 7:
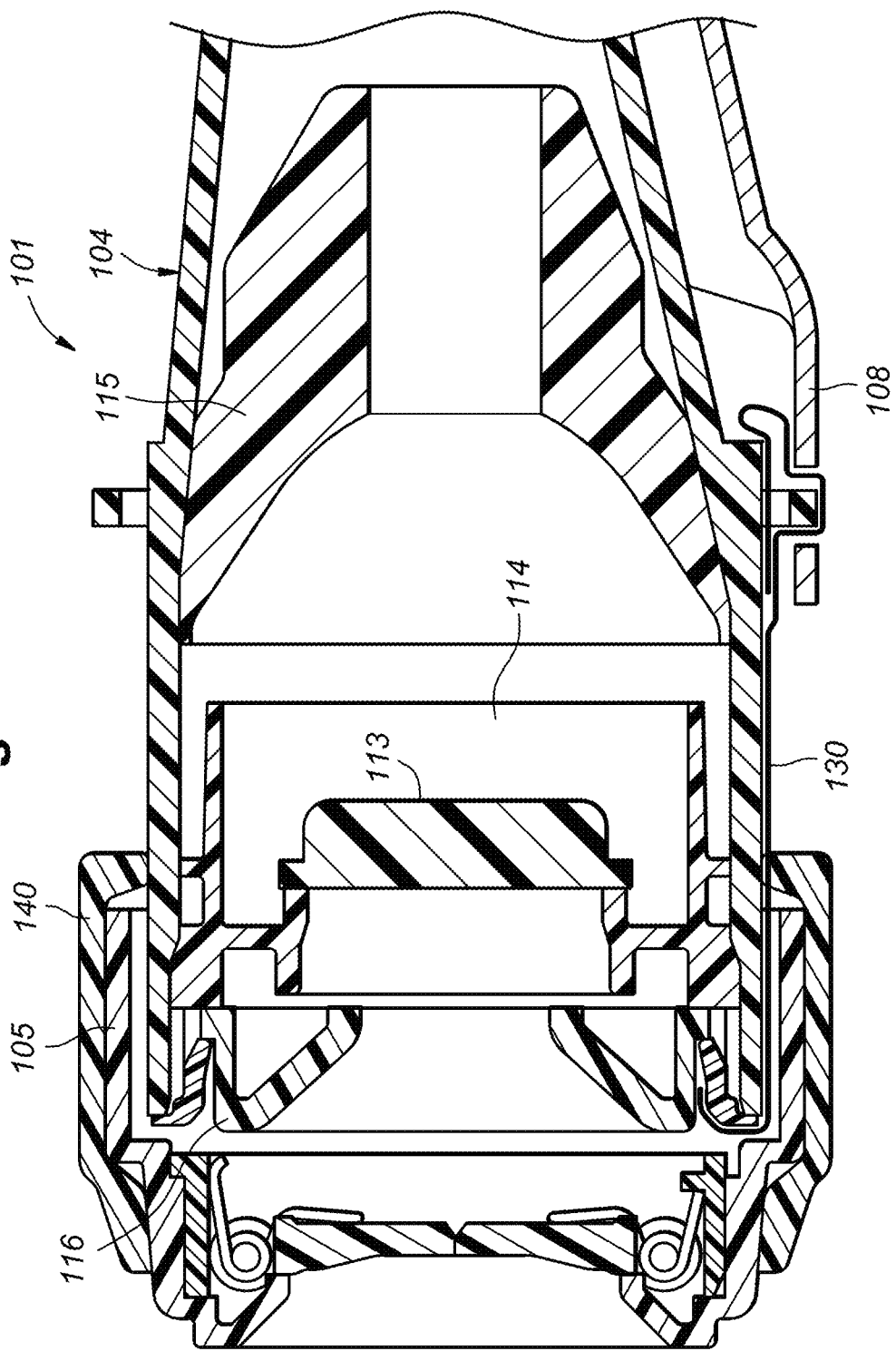
FIG. 7 is a vertical sectional view of a fueling device according to the conventional technology.

These valve support member 14, main flap valve 13, nozzle guide member 16, and fuel guide member 15 may have the same or similar configurations as those of the valve support member 114, the main flap valve 113, the nozzle guide member 116, and the fuel guide member 115 of the conventional structure shown in FIG. 7.

The upstream end 4a of the filler pipe 4 is inserted in the cover member 5 and is joined to the cover member 5 by an appropriate joining structure. The joining structure may be a known structure. For example, the joining structure may be a socket type joining structure which engages the filler pipe 4 with the cover member upon insertion of the filler pipe 4 into the cover member 5 or a bayonet type joining structure which engages the filler pipe 4 with the cover member 5 when the filler pipe 4 is rotated after being inserted into the cover member 5.

Figure 3:
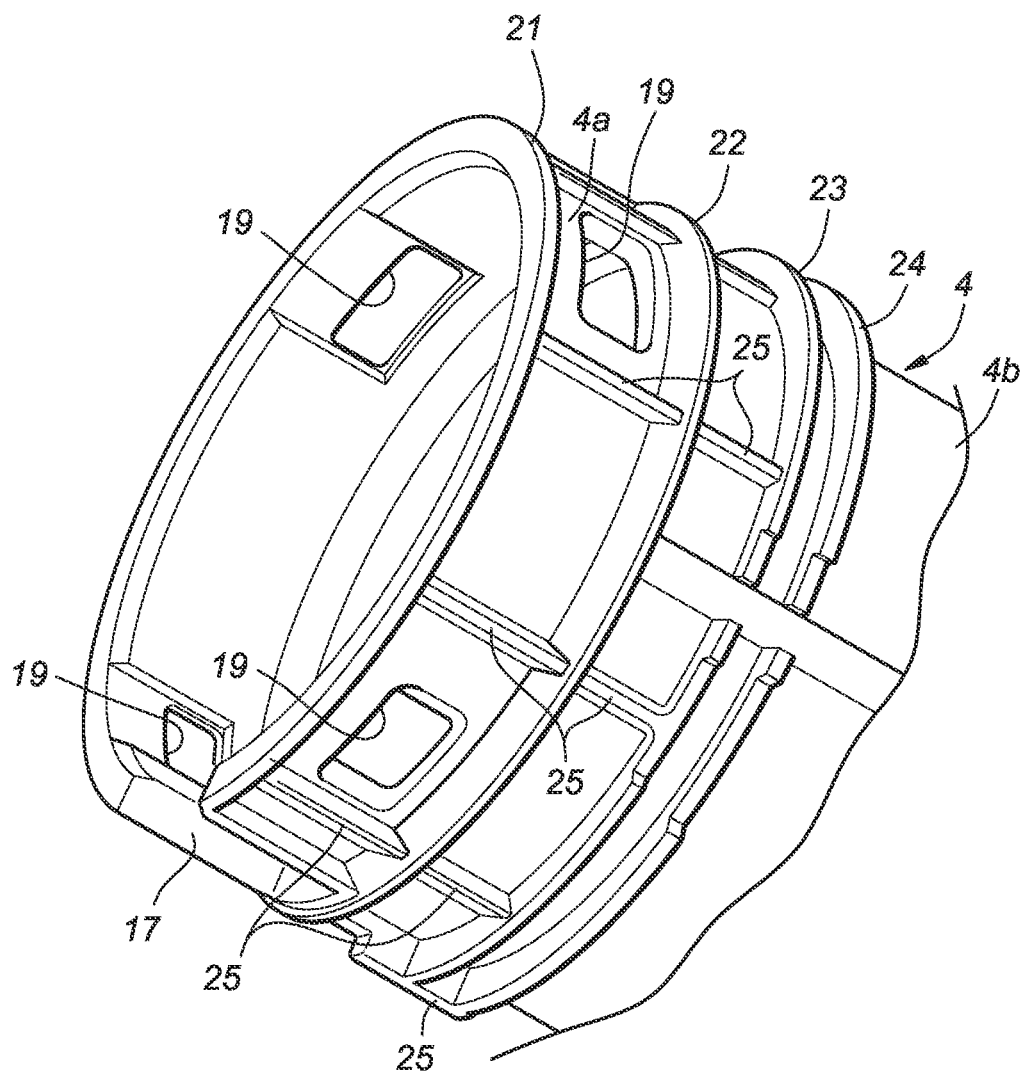
FIG. 3 is a perspective view of a main part of a filler pipe shown in FIG. 2.

FIG. 3 is a perspective view of a main part of the filler pipe 4 shown in FIG. 2. As shown in FIG. 3, the upstream end 4a of the filler pipe 4 is formed with a rectangular notch 17. Further, in the vicinity of the upstream end 4a of the filler pipe 4, multiple rectangular claw reception holes 19 which penetrate through the filler pipe 4 to receive claws 18 (FIG. 2) protrudingly formed on the outer circumferential portion of the valve support member 14 to lock the valve support member 14 are formed to be arranged in the circumferential direction.

The outer surface 4b of the filler pipe 4 is integrally formed with multiple ridges (21 to 24) each extending in the circumferential direction. In the present embodiment, four ridges are formed on a part of the outer surface 4b of the filler pipe 4 covered by the cover member 5. In the following, the ridges are referred to, in order from the upstream side, the first ridge 21, the second ridge 22, the third ridge 23, and the fourth ridge 24. The first ridge 21 is formed at the upstream end 4a of the filler pipe 4 and is bent along the notch 17. The second ridge 22 is formed in a circular annular shape at a position on the downstream side of the multiple claw reception holes 19. The third ridge 23 and the fourth ridge 24 are formed to have a smaller height in parts in the circumferential direction, and are located close to each other.

As shown in FIG. 2, the fourth ridge 24 is disposed at a part of the filler pipe 4 corresponding to the downstream end 5c of the cover member 5. The first ridge 21, the third ridge 23, and the fourth ridge 24 each have a rectangular cross-sectional shape and an outer diameter smaller than an inner diameter of a part of the cover member 5 corresponding thereto. Note that the outer diameter of the third ridge 23 and the fourth ridge 24, which have varying heights, is an outer diameter at the highest part. Thereby, a small gap is formed between each of the first ridge 21, the third ridge 23, and the fourth ridge 24 and the inner surface 5d of the cover member 5. These first ridge 21, third ridge 23, and fourth ridge 24 function as a reinforcement part for reinforcing the cover member 5, as will be described later.

The second ridge 22 has a substantially triangular cross-sectional shape, and has an outer diameter greater than the inner diameter of a corresponding part of the cover member 5. Therefore, the tip of the second ridge 22 closely contacts the inner surface 5d of the cover member 5 over the entire length thereof, and the second ridge 22 functions as an annular seal part interposed between the filler pipe 4 and the cover member 5. Thus, since the seal part is constituted of the second ridge 22 integrally formed on the filler pipe 4 made of resin, there is no need to prepare an additional member for sealing. Therefore, the number of components is reduced and the number of assembly steps is reduced.

As shown in FIG. 3, the first ridge 21 to the third ridge 23 are coupled to each other by multiple axial ribs 25 which are disposed on the outer surface 4b of the filler pipe 4 at predetermined intervals in the circumferential direction and extend in the longitudinal direction. The third ridge 23 and the fourth ridge 24 are coupled to each other by a single axial rib 25.

The third ridge 23 and the fourth ridge 24 have a smaller height at two parts shown in the sectional view of FIG. 2 than at the other parts. Therefore, at these parts, the gap between the inner surface 5d of the cover member 5 and the outer surface 4b of the filler pipe 4 is larger compared to the other parts. In the present embodiment, the height of the third ridge 23 and the fourth ridge 24 is zero at these parts. In other words, at these parts, the third ridge 23 and the fourth ridge 24 are missing.

As shown in FIG. 2, projections 26 that protrude radially outward from the outer surface 4b of the filler pipe 4 are provided at the parts spaced in the downstream direction from the fourth ridge 24 at the circumferential positions corresponding to the missing parts of the third ridge 23 and the fourth ridge 24. Each projection 26 is formed with a through hole 26a that extends in the longitudinal direction of the filler pipe 4. The through hole 26a opens out in the upstream side surface and the downstream side surface of the projection 26. As also shown in FIG. 1, the bracket 8 is fixed to the filler pipe 4 so as to overlap with one of the projections 26 with respect to the longitudinal direction. At the parts of the bracket 8 corresponding to the projections 26, projection receiving holes 28 that penetrate through the bracket 8 to receive the projections 26 are formed.

On a part of the outer surface 4b of the filler pipe 4 where the height of the third ridge 23 and the fourth ridge 24 is low, an earth member 30 is mounted. The earth member 30 is an elongated member having conductivity, and extends along the longitudinal direction of the filler pipe 4. In the present embodiment, the earth member 30 is a bent product formed by bending a metal plate member having elasticity. The earth member 30 extends toward the downstream side from a position downstream of the second ridge 22 and upstream of the third ridge 23 to reach a position downstream of the fourth ridge 24 and overlapping with the bracket 8.

As shown in FIG. 2, the earth member 30 includes an upstream part 31 which is bent outward in a hairpin shape and a main body 32 extending toward the downstream side from the upstream part 31. The upstream part 31 of the earth member 30 resiliently contacts the inner surface 5d of the cover member 5. The upstream part 31 of the earth member 30 is formed with a swelling part 33 which swells outward. A part of the downstream end 5c of the cover member 5 corresponding to the swelling part 33 is formed with a through hole 5e, and with the swelling part 33 entering the through hole 5e, the upstream part 31 is resiliently locked in the through hole 5e of the cover member 5.

In a downstream portion of the main body 32 of the earth member 30, a surrounding part 34 which protrudes outward and extends along the outer contour of the projection 26 to surround the projection 26 from three sides, i.e., from the upstream side, outer side, and downstream side. On the downstream side of the surrounding part 34, an engagement part 35 that protrudes into the through hole 26a of the projection 26 to be engaged with the projection 26 is formed. Also, the earth member 30 is provided with a downstream part 36 which is bent outward in a hairpin shape on the downstream side of the surrounding part 34 and the engagement part 35. The downstream part 36 of the earth member 30 is disposed between the outer surface 4b of the filler pipe 4 and the bracket 8 and resiliently contacts the bracket 8.

Figure 4:
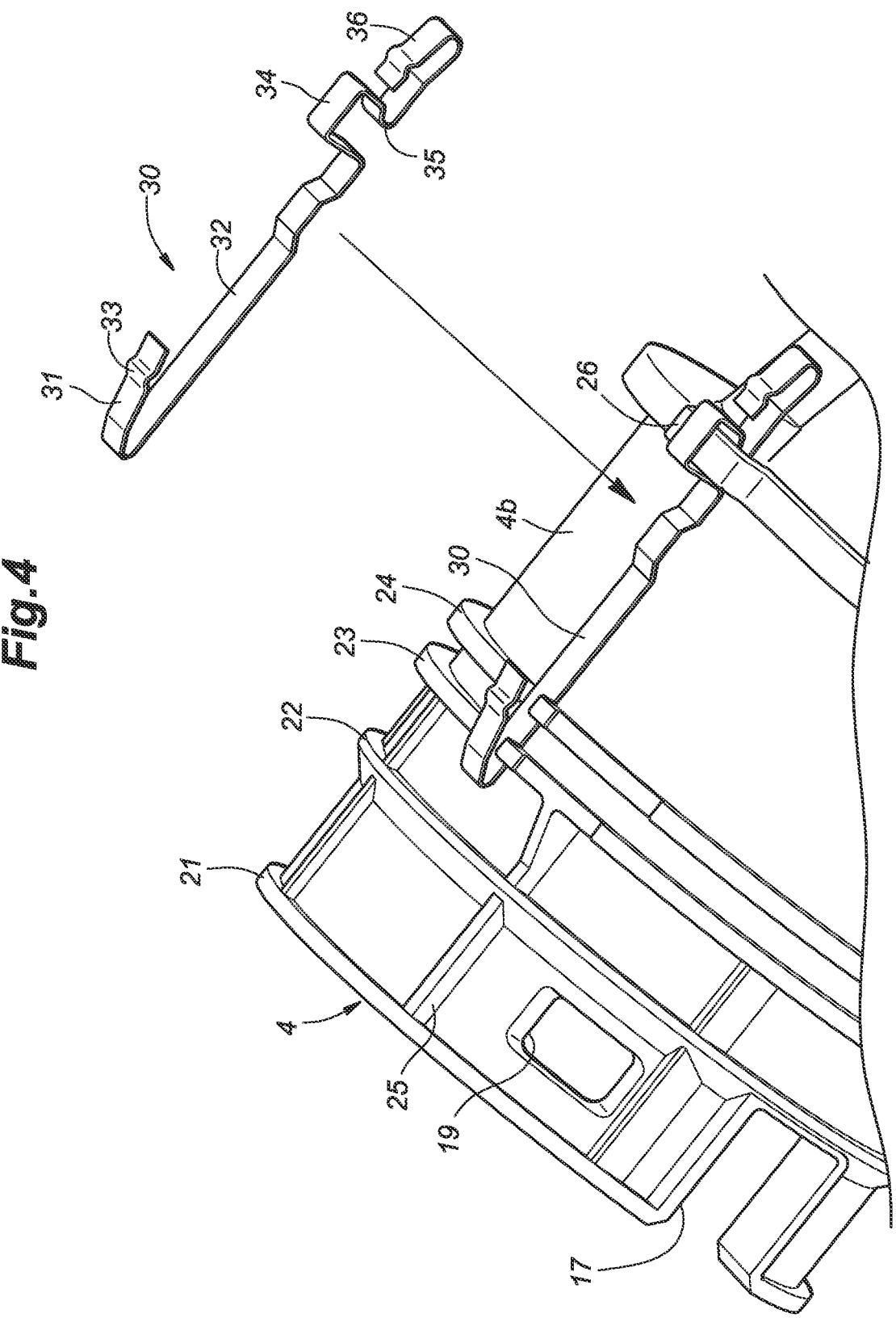
FIG. 4 is an explanatory diagram of a mounting structure of an earth member shown in FIG. 2.

FIG. 4 is an explanatory diagram of a mounting structure of the earth member 30 shown in FIG. 2. As shown in FIGS. 2 and 4, the earth member 30 is mounted on the outer surface 4b of the filler pipe 4, with the main body 32 being received in the missing parts of the third ridge 23 and the fourth ridge 24 and the engagement part 35 protruding into the through hole 26a of the projection 26. In the state in which the earth member 30 is mounted on the outer surface 4b of the filler pipe 4, the upstream end 4a of the filler pipe 4 is inserted into the cover member 5, and the cover member 5 is joined to the filler pipe 4. Also, in the state in which the earth member 30 is mounted on the outer surface 4b of the filler pipe 4, the bracket 8 is attached to the tongue pieces 6 of the filler pipe 4 so as to contact the downstream part 36 of the earth member 30. Thereby, the fueling device 1 is brought in an assembled state shown in FIGS. 1 and 2.

The earth member 30, which has conductivity, extends along the longitudinal direction of the filler pipe 4 and contacts the cover member 5 made of a conductive material at a position downstream of the second ridge 22 while contacting the bracket 8 at the downstream part 36. In other words, the cover member 5 and the bracket 8 are electrically connected to each other by the earth member 30. Thus, the cover member 5 is grounded through the earth member 30, the bracket 8, and the vehicle body, and even though the earth member 30 is not disposed to pass through the second ridge 22 serving as a seal part, electrification of the cover member 5 provided at the upstream end 4a of the filler pipe 4 is prevented. Therefore, when the fueling nozzle 2 is electrified, discharge takes place upon contact of the fueling nozzle 2 with the cover member 5, and thus, vapor filling the fuel passage on the downstream side of the main flap valve 13 would not catch fire.

As shown in FIG. 2, a gap is provided between the downstream end 5c of the cover member 5 and the outer surface 4b of the filler pipe 4 opposing thereto, and in this part, the upstream part 31 of the earth member 30 is bent outward in a hairpin shape. Therefore, the upstream part 31 of the earth member 30 contacts the inner surface 5d of the cover member 5 when the upstream end 4a of the filler pipe 4 is inserted into the cover member 5. This makes the assembly of the earth member 30 easy. Also, since the downstream end 5c of the cover member 5 is provided with the through hole 5e and the upstream part 31 of the earth member 30 is resiliently locked in the through hole 5e, displacement of the earth member 30 after the assembly is prevented.

In another embodiment, instead of the through hole 5e formed in the downstream end 5c of the cover member 5, a recess may be formed on the inner surface 5d of the cover member 5 and the upstream part 31 of the earth member 30 may be resiliently locked in the recess.

As described above, the earth member 30 includes the surrounding part 34 that surrounds the projection 26 from three sides and the engagement part 35 that protrudes from the surrounding part 34 into the through hole 26a of the projection 26. Therefore, the engagement part 35 of the earth member 30 is locked to the projection 26 of the filler pipe 4, whereby falling of the earth member 30 from the filler pipe 4 at the time of assembly is prevented.

In another embodiment, the engagement part 35 may be formed on the upstream side of the surrounding part 34. Also, instead of the through hole 26a formed in the projection 26, a recess may be formed on a surface of the projection 26 on the side on which the engagement part 35 is formed.

Figure 5:
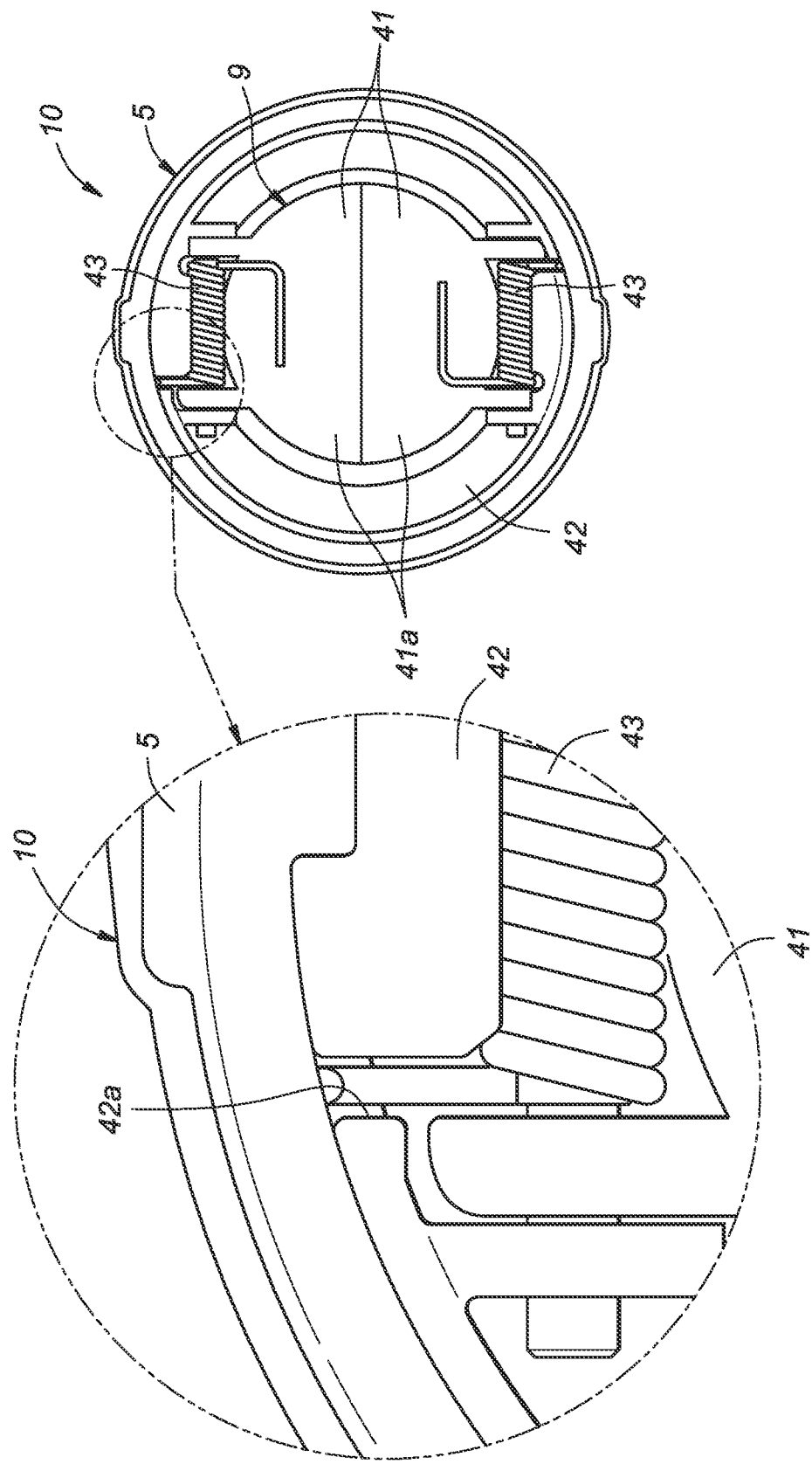
FIG. 5 is a rear view of a cover unit shown in FIG. 1.

FIG. 5 is a rear view of the cover unit 10 shown in FIG. 1. As shown in FIGS. 2 and 5, the shutter 9 is composed of two doors 41 which are divided by a dividing line passing the center of the fueling port 3 and serve as the opening and closing member. The doors 41 are plate-shaped members made of resin having conductivity, and are supported by an annular member 42 fitted inside the cover member 5 of the fueling port 3 so as to be pivotable about respective pivot shafts parallel to the dividing line. The doors 41 are disposed on the downstream side of the fueling port 3 and are provided to be displaceable by pivoting between a closed position in which the doors 41 close the fueling port 3 and an open position which is positioned downstream of the closed position and in which the doors 41 open the fueling port 3 as shown by an imaginary line in FIG. 2.

Further, the shutter 9 is provided with urging members for always urging the doors 41 toward the closed position. In the present embodiment, the urging members are constituted of two torsion coil springs 43 made of metal and mounted on the pivot shafts of the respective doors 41 in a coaxial manner. Each torsion coil spring 43 is supported by the annular member 42, and one end thereof contacts an inner surface 41a of the corresponding door 41, while the other end thereof passes through a notch 42a formed in the annular member 42 and contacts the inner surface 5d of the cover member 5.

As described above, since the doors 41 are pivotably supported by the annular member 42 fitted inside the cover member 5, there is no need to provide the cover member 5 with a structure for rotatably supporting the doors 41. Therefore, the shape of the cover member 5 made of a conductive material is simple, and the moldability of the cover member 5 is good. Also, this allows a high degree of design freedom of the structure for rotatably supporting the doors 41. Further, even though the annular member 42 is fitted inside the cover member 5, the notches 42a formed in the annular member 42 realize a configuration for allowing the torsion coil springs 43 to contact the cover member 5. Note that instead of the notches 42a, through holes may be formed in the annular member 42.

As shown in FIG. 2, when in the closed position, each door 41 is in contact with the cover member 5. On the other hand, when pivoting from the closed position toward the open position, each door 41 is separated from the cover member 5. Note, however, that the doors 41 are electrically connected to the cover member 5 at all times through the torsion coil springs 43.

At the time of fueling, the fueling nozzle 2 (FIG. 6) is pressed against the doors 41 to cause the doors 41 to pivot to the open position which is on the downstream side and to make the fueling port 3 open, whereby the fueling nozzle 2 is inserted into a deeper side (downstream side) of the fueling port 3. Once inserted into a deeper side of the fueling port 3, the fueling nozzle 2 is guided by the nozzle guide member 116 to be on the axis of the filler pipe 4 and causes the main flap valve 13 disposed on a deeper side of the nozzle guide member 116 to pivot toward a deeper side, thereby to open the fuel flow path by. This allows the fuel supplied from the fueling nozzle 2 to be guided to the fuel tank for traveling through the fuel flow path.

The doors 41 are made of a conductive material and, when in the closed position, are in contact with the cover member 5. Therefore, when the fueling nozzle 2 contacts the doors 41 to open the fueling port 3, the fueling nozzle 2 is electrically connected to the cover member 5 through the doors 41 and is grounded through the earth member 30, etc.

As described above, the torsion coil springs 43 are made of a conductive material and are provided to always contact the inner surfaces 41a of the doors 41 and the inner surface 5d of the cover member 5. Therefore, not only when in the closed but also when in a position other than the closed position, the doors 41 are electrically connected to the cover member 5 through the urging members. Accordingly, the fueling nozzle 2 is grounded through the doors 41, the torsion coil springs 43, the cover member 5, etc. not only at the moment when the fueling nozzle 2 comes into contact with the doors 41 but also while the fueling nozzle 2 is opening the fueling port 3.

Figure 6:
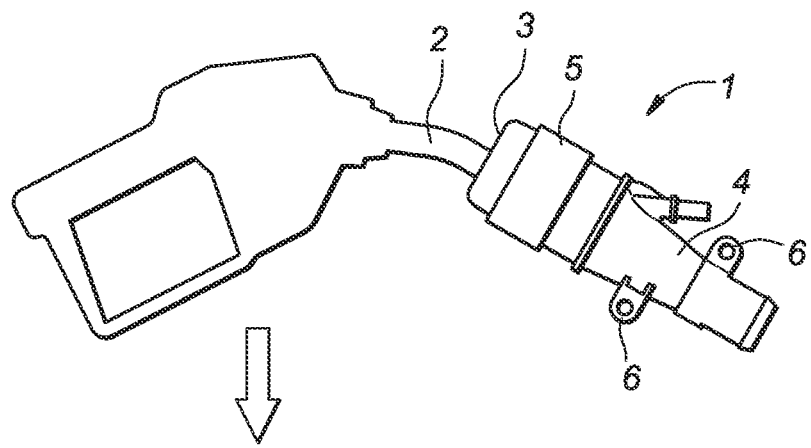
FIG. 6 is an explanatory diagram of a load acting on the filler pipe at the time of fueling.

When a fueling person releases the hand in the state in which the fueling nozzle 2 is inserted into the fuel flow path, a state in which the fueling nozzle 2 is supported by the fueling device 1 may occur as shown in FIG. 6. At this time, the load of the fueling nozzle 2 indicated by a white arrow acts on the cover member 5, and this may cause the cover member 5 to deform into an elliptical shape.

In the present embodiment, as shown in FIG. 2, the part of the outer surface 4b of the filler pipe 4 covered by the cover member 5 is provided with four ridges each extending in the circumferential direction, and the second ridge 22 functions as a seal part. Further, the first ridge 21 is disposed on the upstream side of the second ridge 22 to function as a reinforcement part, and the third ridge 23 and the fourth ridge 24 are disposed on the downstream side of the second ridge 22 to function as a reinforcement part. Namely, t least one of the ridges is disposed on each of the upstream side and the downstream side of the seal part to function as a reinforcement part. Thereby, the filler pipe 4 can be reinforced without deterioration of assemblability, and deformation of the cover member 5 is suppressed. Also, since the deformation of the cover member 5 is suppressed, close contact of the second ridge 22 with the inner surface 5d of the cover member 5 is maintained and lowering of sealability is suppressed.

In addition, since each of the first ridge 21, the third ridge 23, and the fourth ridge 24 has an outer diameter smaller than an inner diameter of a part of the cover member 5 corresponding thereto, deterioration of close contactability of the second ridge 22 with the inner surface 5d of the cover member 5 is suppressed. Therefore, it is possible to suppress deformation of the cover member 5 while ensuring sealability between the filler pipe 4 and the cover member 5.

Further, the first ridge 21 is disposed at the upstream end 4a of the filler pipe 4, and the fourth ridge 24 is disposed at a part of the filler pipe 4 corresponding to the downstream end 5c of the cover member 5. Therefore, compared to a case where the first ridge 21 or the fourth ridge 24 is provided at a position closer to the second ridge 22, deformation of the cover member 5 can be effectively suppressed.

A concrete embodiment has been described in the foregoing, but the present invention is not limited to the above embodiment and may be modified or altered in various ways. For example, in the above embodiment, the fueling device 1 is installed in an automobile, but it may be installed in a moving body other than an automobile, such as a watercraft, an airplane, etc. The fueling device 1 may be provided in a device such as an electric generator or a fixed object (real estate). Also, the fueling device 1 is not limited to the one for guiding the fuel to the fuel tank for movement of a moving body, and may be used to guide the fuel to a tank for transportation of a tank lorry or a tanker for transporting the fuel, for example. In the above embodiment, the seal part is configured by the second ridge 22 integrally formed on the filler pipe 4, but the seal part may be integrally formed on the inner surface 5d of the cover member 5 or may be configured by a separate member such as an O-ring. Besides, the concrete structure, arrangement, number, material, manufacturing method, etc. of each member or part may be appropriately changed without departing from the spirit of the present invention. Also, not all of the components shown in the above embodiment are necessarily indispensable and they may be selectively adopted as appropriate.

LIST OF REFERENCE NUMERALS

1: fueling device
2: fueling nozzle
3: fueling port
4: filler pipe
4a: upstream end
4b: outer surface
5: cover member
5c: downstream end
5d: inner surface
5e: through hole
8: bracket
9: shutter
21: first ridge (reinforcement part)

22: second ridge (seal part)
23: third ridge (reinforcement part)
24: fourth ridge (reinforcement part)
26: projection
26a: through hole
30: earth member
31: upstream part
34: surrounding part
35: engagement part
41: door (opening and closing member)
41a: inner surface
42: annular member
42a: notch
43: torsion coil spring (urging member)

The invention claimed is:

1. An earth structure for a filler pipe, comprising:
the filler pipe;
a tubular cover member into which an upstream end of the filler pipe is inserted and which defines a fueling port;
an annular seal part configured to create a seal between the filler pipe and the cover member;
an earth member which is mounted on an outer surface of the filler pipe and extends along a longitudinal direction of the filler pipe;
an opening and closing member provided to be displaceable between a closed position in which the opening and closing member closes the fueling port and an open position which is positioned downstream of the closed position and in which the opening and closing member opens the fueling port; and
an urging member always urging the opening and closing member toward the closed position,
wherein the cover member is made of a conductive material, and the earth member contacts the cover member downstream of the seal part,
the opening and closing member is made of a conductive material and, when in the closed position, contacts the cover member, and
the urging member is made of a conductive material and is provided to be always in contact with an inner surface of the opening and closing member and an inner surface of the cover member.

2. The earth structure for a filler pipe according to claim 1, wherein the opening and closing member is pivotably supported by an annular member fitted inside the cover member, and the annular member is formed with a notch or a through hole for allowing the urging member to contact the cover member.

3. The earth structure for a filler pipe according to claim 1, wherein the seal part is a ridge formed integrally with one of the filler pipe made of resin and the cover member made of resin.

4. The earth structure for a filler pipe according to claim 3, wherein the seal part is formed integrally with the filler pipe, and
a part of the outer surface of the filler pipe covered by the cover member is provided with multiple reinforcement parts extending in a circumferential direction, at least one of the reinforcement parts being disposed on each of an upstream side and a downstream side of the seal part.

5. The earth structure for a filler pipe according to claim 4, wherein each of the reinforcement parts has an outer diameter smaller than an inner diameter of a part of the cover member corresponding thereto.

6. The earth structure for a filler pipe according to claim 5, wherein the reinforcement parts are disposed at the upstream end of the filler pipe and at a part of the filler pipe corresponding to a downstream end of the cover member.

7. An earth structure for a filler pipe, comprising:
the filler pipe;
a tubular cover member into which an upstream end of the filler pipe is inserted and which defines a fueling port;
an annular seal part configured to create a seal between the filler pipe and the cover member; and
an earth member which is mounted on an outer surface of the filler pipe and extends along a longitudinal direction of the filler pipe,
wherein the cover member is made of a conductive material, and the earth member contacts the cover member downstream of the seal part,
a gap is provided between a downstream end of the cover member and the outer surface of the filler pipe opposing thereto, and
the earth member is a bent product of a plate member, an upstream part of the earth member being bent outward in a hairpin shape and resiliently contacts an inner surface of the cover member.

8. The earth structure for a filler pipe according to claim 7, wherein the inner surface of the downstream end of the cover member is provided with a recess or a through hole, and
the upstream part of the earth member is resiliently locked in the recess or the through hole.

9. The earth structure for a filler pipe according to claim 7, wherein a projection is provided on the outer surface of the filler pipe on a downstream side of the downstream end of the cover member, a recess or a through hole is provided in an upstream side surface or a downstream side surface of the projection, and the earth member comprises a surrounding part extending along an outer contour of the projection to surround the projection from three sides, and an engagement part that protrudes into the recess or the through hole from the surrounding part.

* * * * *